United States Patent [19]

Adkison et al.

[11] 4,380,849

[45] Apr. 26, 1983

[54] APPARATUS FOR REMOVING MEAT FROM POULTRY DRUMSTICKS

[75] Inventors: Frank L. Adkison, West Liberty; Jack L. Kress, Wilton, both of Iowa

[73] Assignee: Oscar Mayer Foods Corporation, Madison, Wis.

[21] Appl. No.: 244,735

[22] Filed: Mar. 17, 1981

[51] Int. Cl.³ .................................................. A22C 17/04
[52] U.S. Cl. ....................................... 17/11; 17/1 G
[58] Field of Search .................... 17/11, 11 C, 1 G, 46

[56] References Cited

U.S. PATENT DOCUMENTS

| | | | |
|---|---|---|---|
| 2,857,619 | 10/1958 | Massengill | 17/1 G |
| 3,216,056 | 11/1965 | Segur | 17/1 G |
| 3,233,282 | 2/1966 | Segur | 17/11 |
| 3,510,908 | 5/1970 | Segur et al. | 17/11 |
| 4,216,565 | 8/1980 | Volk et al. | 17/1 G |
| 4,299,009 | 11/1981 | Tournier | 17/1 G |

Primary Examiner—Willie G. Abercrombie
Attorney, Agent, or Firm—Lockwood, Dewey, Alex & Cummings

[57] ABSTRACT

An apparatus is provided for removing meat from poultry drumsticks by closing mechanical jaws onto the meat of a drumstick, mechanically grasping one end of the drumstick bone, and then removing the meat by driving the drumstick bone om a direction away from the meat while the meat is grasped by the mechanical jaws.

20 Claims, 7 Drawing Figures

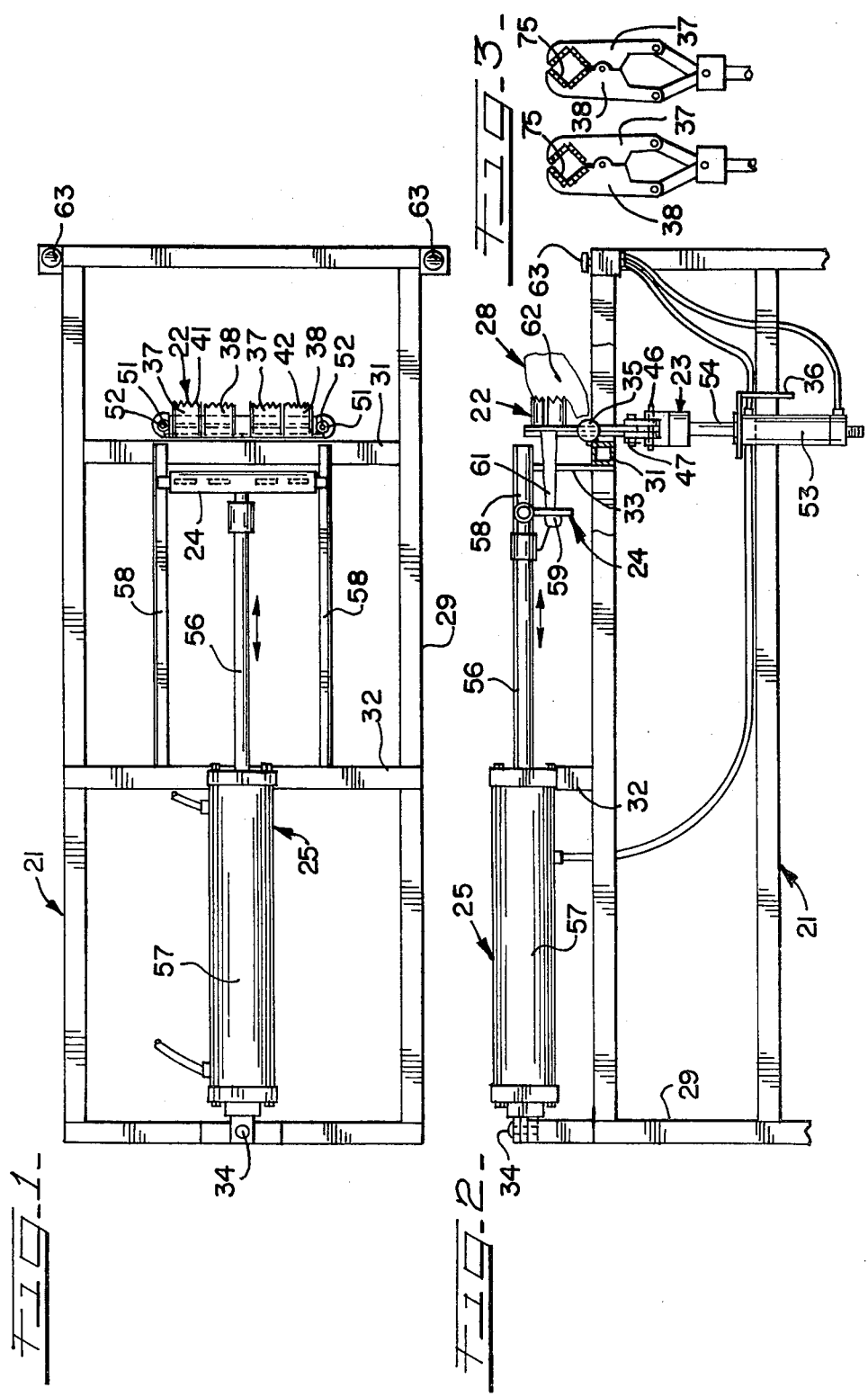

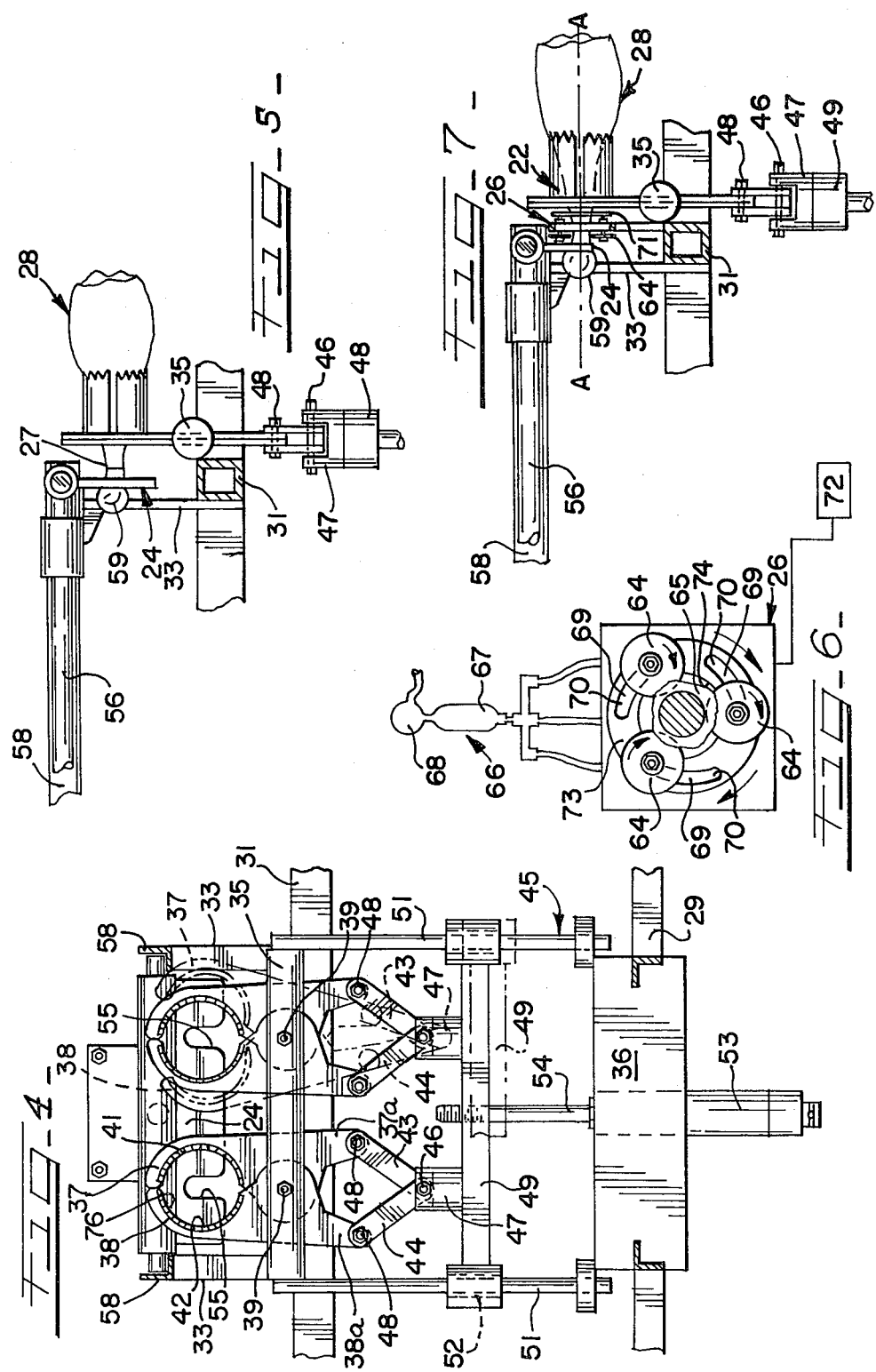

APPARATUS FOR REMOVING MEAT FROM POULTRY DRUMSTICKS

This invention generally relates to an apparatus for removing meat from poultry drumsticks. More particularly, this invention relates to an apparatus for removing meat from poultry drumsticks by subjecting the meat and the drumstick bone to oppositely directed forces whereby the drumstick bone is moved through and separated from the meat.

Poultry deboning machines are known from U.S. Pat. Nos. 2,840,849, 2,897,536, and 3,216,056. These prior art machines are relatively complex and require considerable synchronization of various mechanisms in order to effectively and consistently remove the meat from the bones. Therefore, there is a need for a positive acting and clean operating apparatus that will effectively and consistently remove the meat from poultry drumsticks, especially turkey drumsticks, while both avoiding breakage of the tibiotarsus as well as avoiding removal of the tendons, gristle, and especially the numerous slender, elongated cartilage tissues found on the lower leg or drumstick portion of a turkey.

Such desirable attributes and properties are achieved in accordance with the present invention by providing an apparatus including a jaw assembly having opening and closing means for selectively opening the jaw assembly to permit insertion of a poultry drumstick and for selectively closing the jaw assembly around the bulk of the drumstick meat. This apparatus further includes a member for grasping one end of the drumstick bone. Also provided is means for selectively driving the grasping member away from the jaw assembly whereby the meat is substantially removed from the drumstick bone by the jaw assembly closed around the meat. In order to enhance the efficiency of meat removal and significantly reduce any chance of breakage of the drumstick bone, the apparatus can include an assembly for scoring the meat near the end of the drumstick bone.

Accordingly, an object of the present invention is to provide an apparatus for removing meat from poultry drumsticks.

Another object of this invention is to provide an improved apparatus for efficiently and consistently removing poultry meat from the drumstick bone while leaving substantially all of the gristle material on the drumstick bone.

Another object of the present invention is an improved apparatus for removing meat from a poultry drumstick while avoiding breakage of the drumstick bone.

Another object of this invention is an improved apparatus for removing meat from poultry drumsticks in association with forming a circumferential score into the poultry meat near the grasped end of the drumstick bone.

These and other objects of the present invention will become apparent from the following detailed description and drawings, wherein:

FIG. 1 is a plan view of the apparatus shown with a fully opened jaw assembly and with the grasping member driving means in non-urging condition;

FIG. 2 is a side elevation view of the apparatus of FIG. 1 showing the jaw assembly closed around partially removed drumstick meat and the grasping member driving means in a partially urging condition;

FIG. 3 is an elevation view of the jaw assembly of FIG. 1 having generally diamond-shaped openings;

FIG. 4 is an end elevation view illustrating the jaw assembly operation means and a jaw assembly having generally circular openings;

FIG. 5 is an enlarged, detail elevation view of the apparatus shown in FIG. 1 and further illustrating a drumstick placed with the closed jaw assembly prior to movement of the driving means;

FIG. 6 is an elevation view of an optional, advantageous scoring assembly; and

FIG. 7 is an elevation view illustrating the preferred placement of the scoring assembly onto the apparatus of FIG. 1.

Illustrated in FIGS. 1 through 5 is the preferred embodiment of the apparatus according to this invention, which includes mechanism support means (generally designated as 21) to which is affixed a jaw assembly 22, jaw assembly operation means generally shown at 23, a grasping member 24, and grasping member driving means illustrated generally by 25. While a dual jaw assembly and grasping members are illustrated, this being a most efficient and convenient arrangement for a single operator using both hands, any number of jaw assemblies and grasping members may be provided as desired. FIGS. 6 and 7 illustrate a scoring assembly, generally designated as 26, for effecting a circumferential score 27 (FIG. 5) into a narrow cross-section of a poultry drumstick.

Mechanism supporting means 21 includes a rigid frame 29 having grasping member mounting means including main support bars 31 and 32, associated support members 33 and an anchoring member 34. Also included on the rigid frame 29 is means for supporting the jaw assembly 22, including a primary support rod 35 and a brace 36.

Each jaw assembly 22 includes a right jaw member 37 and a left jaw member 38 which are mounted to the primary support rod 35 about a pivot pin 39 and oriented such that teeth 41 of the right jaw member generally oppose teeth 42 of the left jaw member, leaving an opening having a shape similar to a cross-section through a drumstick 28 and an area that is noticeably less than the largest cross-sectional area through drumstick 28. Each of the jaw members 37 and 38 has a lever arm 37a and 38a, respectively, extending beyond the pivot pin 39 in a direction away from the teeth 41 and 42, respectively.

Jaw assembly operation means 23 includes a right linkage member 43 and a left linkage member 44 which are pivotally mounted at one end thereof to a carriage assembly 45 by means of a pivot rod 46 to yoke 47 of the carriage assembly 45. The opposite ends of the right linkage member 43 and the left linkage member 44 are pivotally connected to the lever arm 37a and the lever arm 38a, respectively, through pins 48 at a location near the end of each respective lever arm 37a and 38a and spaced outwardly from the pivot pin 39 on opposite sides thereof.

The carriage assembly 45 includes a spanner bar 49 to which each yoke 47 is mounted. The spanner bar 49 is slidable along guides 51, and each spanner bar 49 preferably includes a sleeve 52 for reducing friction during movement of the carriage assembly 45. The spanner bar 49 is secured to means for moving the spanner bar 49 back and forth along the guides 51, which movement means may take the form of a piston and cylinder assembly as shown having a pneumatic cylinder 53 and a projecting piston rod 54.

Jaw assembly operation means 23 closes the jaw assembly 22 as the projecting piston rod 54 moves further out of the pneumatic cylinder 53, thereby raising the carriage assembly 45 and moving the pins 48 in arcuate paths centered about the pivot pin 39. Because the lever arms 37a and 38a receive the pins 48 at respective locations spaced outwardly from the pivot pin 39, the lever arms 37a and 38a move in an outward direction in response to forces applied to and toward the lever arms 37a and 38a by pivot rod 47 positioned between the pins 48 and in operative interengagement therewith through the linkage members 43 and 44. This movement of the lever arms 37a and 38a in a direction generally away from each other pivots the right jaw member 37 and the left jaw member 38 about the pivot pin 39 such that the respective teeth-ends of the jaw members 37 and 38 move toward each other for firmly grasping a drumstick 28 when positioned generally between the right and left jaw members 37 and 38.

Release of the jaw assembly 22 is accomplished by movement of the carriage assembly 45 in a direction away from the jaw members 37 and 38 by activation of the pneumatic cylinder 53 to retract the piston rod 54. Movement of the carriage assembly 45 in this direction moves the pins 48 in arcuate paths generally toward each other, with the pivot pin 39 as the common of the arcuate paths, whereby the lever arms 37a and 38a move toward each other and generally inwardly toward the pivot rod 46. Consequently, the right jaw member 37 and the left jaw member 38 rotate about the pivot pin 39 such that the respective teeth 41 and 42 move generally away from each other to increase the opening in order to permit insertion of a drumstick 28 into the grasping member 24 and into the jaw assembly 22.

The grasping member 24 contains at least one slot 55 for receiving the distal end (the knuckle end) of a drumstick bone. Grasping member 24 is rigidly secured to the grasping member driving means 25 which is provided to traverse a path of the grasping member 24 either away from or toward the jaw assembly 22. This driving means 25 may take the form, as shown, of a piston and cylinder having an elongated externally extending piston rod 56 and a pneumatic cylinder 57. Guide rails 58 assist in maintaining the proper alignment of the grasping member 24, which guide rails 58 and/or grasping member 24 may include a friction-reducing surface and/or means for facilitating back and forth movement of the grasping member 24.

In operation, with the carriage assembly 45 lowered and thus the jaw assembly 22 opened, and with the grasping member 24 in close proximity to the jaw assembly 22, the operator inserts the distal end 59 of a drumstick 28 into the slot 55. The carriage assembly 45 is then raised, which closes the right and left jaw members 37 and 38 around the drumstick 28 at a location on the distal side of the largest cross-section of the drumstick 28. After the jaw assembly 22 closes, the grasping member 24 traverses a path away from the jaw assembly 22, whereby the drumstick bone 61 is pulled out of the meat 62 of the drumstick 28. The drumstick bone 61 falls out of the slot 55 into suitable collection means (not shown), while the meat 62 is collected separately.

With the preferred arrangement shown, the operator places a poultry drumstick 28 into each of the dual jaw assemblies 22 and dual slots 55 and then activates the apparatus by depressing a two-button hold-down means 63, which automatically activates the pneumatic cylinder 53 to close the jaw assemblies 22. The grasping member driving means pneumatic cylinder 57 is also automatically activated in order to move the slots 55 away from the jaw assemblies 22 to remove the meat from the drumstick bone 61 of each of the poultry drumsticks 28. Once the slots 55 traverse a predetermined distance that is longer than the longest drumstick bone likely to be encountered, the grasping member 24 returns to a position close to the jaw assemblies 22, and the pneumatic cylinder 53 is automatically activated to open the jaw assemblies 22 for reception of further poultry drumsticks 28 into the apparatus to begin a repeat of this cycle.

Referring particularly to the embodiment illustrated in FIGS. 6 and 7, it is advantageous to make the circumferential score 27 into the poultry meat 62 at a predetermined location 65 near the distal end 69 of the drumstick bone 61, where the bone is of a narrow cross-section. This scoring can be accomplished manually by circular movement of a sharp knife, but this is a time consuming and labor intensive operation. Such a step can be carried out automatically by providing the scoring assembly 26, which is mounted between the jaw assembly 22 and the grasping member 24. Scoring assembly 26 creates the circumferential score 27 by rotation of one or more cutting blades 64 to cut a narrow path into the meat of narrow cross-section at the predetermined location 65. Scoring assembly 26 operates automatically to form the circumferential score 27 without cutting through the drumstick bone 61 by including an automatic sensing means, generally designated 66, that stops movement of the cutting blades 64 when the first blade first touches the drumstick bone 61. The scoring assembly 26 rotates around the drumstick bone 61 generally concentrically with the bone's axis "A" in order to form circumferential score 27 to a depth no greater than the smallest meat thickness at the predetermined location 65. Sensing means 66 is responsive to a certain preselected resistance which is greater than the resistance provided by poultry meat at the predetermined location 65 and less than the resistance of the drumstick bone 61. Sensing means 66 illustrated has a pneumatic drive assembly 67 for movement of the blades 64 toward the drumstick bone 61 until the preselected resistance is met. Air flow regulator 68 stops further movement of the blades 64 toward the drumstick bone 61 and maintains the location of the blades 64 where the preselected resistance was reached.

With more particular reference to the structure illustrated in FIGS. 6 and 7, the blades 64 are restricted to movement through a path along arcuate slots 69 which have an arc that is not concentric with the axis of rotation "A" of the scoring assembly 26. By this structure, the cutting blades 64 move close to the drumstick bone 61 as they move along the arcuate slots 69 by means of a rotation plate 71 which is activated by control means 72 activated by the two-button hold-down means 63. After the sensing means 66 is activated to stop movement through the slots 69, the disc 73 is rotated while the cutting blades 64 continue rotating to cut through the predetermined location 65 until the circumferential score 27 is completely formed. The cutting blades 64 then return to the ends 70 of their respective slots 69 that are spaced farthest from the axis "A".

Operation of the scoring assembly 26 is interfaced with operation of the rest of the apparatus. More particularly, the operator places the distal end 59 of the poultry drumstick 29 through open jaw assembly 22, through an opening 74 of the scoring assembly 26 while the blades 64 are at their slot ends 70 so as to not substantially obstruct the opening 74, and then into the slots 55 of the grasping member 24. Then, the operator depresses the two-button hold-down means 63 to close the jaw assembly 22 and promptly activate the scoring assembly 26 until the circumferential score 27 has been completed, after which the grasping member driving means 25 automatically pulls the drumstick bone 61 through and out of the meat.

With more particular reference to the jaw assembly 22, the right jaw member 37 and the left jaw member 38 combine to carry out a tong-like action to form the opening having a cross-section similar in shape to that of a poultry drumstick and somewhat smaller than the area of largest cross-section of a drumstick. This opening can be a generally diamond-shape opening 75 as illustrated best in FIG. 3, or a substantially circularly shaped opening 76 as illustrated in FIG. 4. Also teeth 41 and 42 may be replaced by any other structure or material that effectively holds the poultry meat in opposition to the rather substantial forces provided by the drawing means 25.

As used in this application, the term "drumstick bone" will be understood to include the lower leg bone and similar long bones of poultry.

This invention can be embodied in various forms and, therefore, is to be construed and limited only by the scope of the appended claims.

We claim:

1. An apparatus for removing meat from a poultry drumstick, wherein the apparatus comprises:
   support means;
   a jaw assembly mounted onto the support means and having a pivoting, tong-like action;
   jaw assembly operation means in operative interengagement with the jaw assembly for selectively closing the jaw assembly onto meat overlying a drumstick bone or opening the jaw assembly, said jaw assembly operation means includes a linkage member pivotally mounted to said jaw assembly;
   said linkage member being pivotally mounted at one end thereof to said jaw assembly, said linkage member being pivotally mounted at its other end to a movable carriage assembly, said carriage assembly including means for moving the carriage assembly either toward or away from said jaw assembly, whereby movement of said movable carriage assembly toward said jaw assembly closes said jaw assembly and movement of said movable carriage assembly away from said jaw assembly opens said jaw assembly;
   a grasping member for holding one end of the drumstick bone; and
   means for selectively driving the grasping member either toward or away from the jaw assembly to remove the meat from the drumstick bone.

2. The apparatus of claim 1, wherein the jaw assembly includes a right jaw member and a left jaw member which are pivotally mounted about a pivot pin affixed to the support means.

3. The apparatus of claim 1, wherein the jaw assembly includes a pivotally mounted right jaw member and a pivotally mounted left jaw member and, when the jaw assembly is closed, an opening between the jaw members is formed which has a shape similar to a cross-section through a poultry drumstick and an area less than the largest cross-sectional area through the poultry drumstick.

4. The apparatus of claim 1, wherein the jaw assembly includes a right jaw member and a left jaw member which are pivotally mounted together onto a pivot pin, each jaw member having a lever arm extending beyond the pivot pin in a direction away from that portion of the jaw assembly that closes onto the meat.

5. The apparatus of claim 2, wherein the jaw assembly operation means includes a right linkage member pivotally mounted at one end to the right jaw member, a left linkage member pivotally mounted at one end to the left jaw member, the right and left linkage members being pivotally mounted together at their respective other ends to said movable carriage assembly.

6. The apparatus of claim 1, wherein the carriage assembly includes a yoke in pivotal operative interengagement with the jaw assembly, the yoke being mounted to a spanner bar slidable along guides attached to the support means.

7. The apparatus of claim 1, wherein the tong-like jaw assembly includes a right jaw member and a left jaw member which are pivotally mounted together along a pivot pin, each jaw member having an end for closing onto the meat and an opposite end, whereby movement of the opposite ends generally toward each other moves the meat closing ends generally away from each other.

8. The apparatus of claim 1, wherein the jaw assembly includes a right jaw member and a left jaw member which are pivotally mounted together about a pivot pin, each jaw member having a pin beyond the pivot pin in a direction away from that portion of the jaw assembly that closes onto the meat, whereby each pin moves in a generally arcuate path around the pivot pin, a right linkage member pivotally connected at one end to the pin of the right jaw member, a left linkage member pivotally connected to one end to the pin of the left jaw member, the right and left linkage members being in pivotal interengagement with each other at respective opposite ends through a pivot rod of the jaw assembly operation means.

9. The apparatus of claim 1, wherein the grasping member includes at least one slot for receiving the distal end of a drumstick bone.

10. The apparatus of claim 1, wherein the jaw assembly and the grasping members have means for receiving two poultry drumsticks.

11. The apparatus of claim 1, further including scoring means for forming a circumferential score into a narrow cross-section portion of the meat near the distal end of the drumstick bone.

12. The apparatus of claim 11, wherein the scoring means includes at least one rotating cutting blade mounted on an assembly for moving the blade toward a drumstick and sensing means for stopping the blade movement upon contact with the drumstick bone.

13. The apparatus of claim 1, further including apparatus control means for first activating the jaw assembly operation means to close the jaw assembly and then activating the grasping member driving assembly to move the grasping member away from the jaw assembly.

14. The apparatus of claim 11, further including apparatus control means for first activating the jaw assembly operation means to close the jaw assembly, then activating the scoring means to form the circumferential score, and then activating the grasping member driving assembly to move the grasping member away from the jaw assembly.

15. The apparatus of claim 1, wherein the jaw assembly includes a right jaw member and a left jaw member which are pivotally mounted together along a pivot pin, each jaw member having an end for closing onto the poultry meat and an opposite end, and wherein the jaw assembly operation means includes said movable carriage assembly, a right linkage member pivotally interconnecting the opposite end of the right jaw member to a pivot point on the carriage assembly, and a left linkage member pivotally interconnecting the opposite end of the left jaw member to the pivot point on the carriage assembly.

16. The apparatus of claim 15, wherein the pivot point on the carriage assembly and the pivot pin of the jaw assembly lie along a line between the right and left jaw members.

17. The apparatus of claim 1, wherein the grasping member includes a downwardly opening slot for receiving the distal end of a drumstick bone.

18. The apparatus of claim 1, wherein the grasping member driving means includes a pneumatic piston and cylinder assembly and guide rails for the grasping member.

19. The apparatus of claim 11, wherein the scoring means is mounted between the jaw assembly and the grasping members.

20. The apparatus of claim 12, further including means for rotating the cutting blade circumferentially along an axis generally coincident with that of a drumstick bone to form the circumferential score.

* * * * *

UNITED STATES PATENT AND TRADEMARK OFFICE
CERTIFICATE OF CORRECTION

PATENT NO. : 4,380,849
DATED : April 26, 1983
INVENTOR(S) : Frank L. Adkison and Jack L. Kress It is certified that error appears in the above-identified patent and that said Letters Patent are hereby corrected as shown below:

Column 4, line 19, "69" should read --59--.

Column 5, line 2, "29" should read --28--.

Signed and Sealed this

Twenty-sixth Day of July 1983.

[SEAL]

Attest:

GERALD J. MOSSINGHOFF

Attesting Officer     Commissioner of Patents and Trademarks